United States Patent
Doshi (10) Patent No.: US 12,360,853 B2
(45) Date of Patent: Jul. 15, 2025

(54) METHODS AND SYSTEMS OF SCANNING FOR RESOURCES FOR RESOURCE CLASSIFICATION IN A MULTI CLOUD ENVIRONMENT

(71) Applicant: DELL PRODUCTS L.P., Round Rock, TX (US)

(72) Inventor: Girish Balvantrai Doshi, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 459 days.

(21) Appl. No.: 17/578,073

(22) Filed: Jan. 18, 2022

(65) Prior Publication Data

US 2023/0229566 A1 Jul. 20, 2023

(51) Int. Cl.
*G06F 11/14* (2006.01)
*G06F 16/23* (2019.01)

(52) U.S. Cl.
CPC ...... *G06F 11/1461* (2013.01); *G06F 11/1451* (2013.01); *G06F 11/1464* (2013.01); *G06F 11/1466* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 10,318,742 | B1* | 6/2019 | Sankruthi | G06F 21/577 |
| 11,093,493 | B1* | 8/2021 | Krishnaswamy | G06F 16/2453 |
| 11,113,156 | B2* | 9/2021 | Brewer | G06F 11/2097 |
| 2007/0050777 | A1* | 3/2007 | Hutchinson | G06F 11/0781 |
| | | | | 718/104 |
| 2007/0271431 | A1* | 11/2007 | Hwang | G06F 11/1471 |
| | | | | 711/162 |
| 2021/0073034 | A1* | 3/2021 | Bliesner | G06F 9/5077 |
| 2021/0160720 | A1* | 5/2021 | Chiang | H04B 17/318 |
| 2021/0336968 | A1* | 10/2021 | Bender | H04L 63/145 |
| 2022/0046038 | A1* | 2/2022 | Sinha | H04L 63/0236 |
| 2023/0058573 | A1* | 2/2023 | Singh | G06F 3/04842 |

* cited by examiner

*Primary Examiner* — Richard L Bowen
(74) *Attorney, Agent, or Firm* — WOMBLE BOND DICKINSON (US) LLP (57) ABSTRACT

Methods and systems of scanning for resources for resource classification in a multi cloud environment are disclosed. For a combination of a cloud account, a cloud region, and a resource type, a percentage of protected existent resources hosted on the cloud computing platform is determined. A cycle skip count is set based on the determined percentage of the protected existent resources hosted on the cloud computing platform. The percentage of the protected existent resources and the cycle skip count associated with the combination are stored in a catalog. For the combination of the cloud account, the cloud region, and the resource type, the protected existent resources hosted on the cloud computing platform are periodically scanned for based on the cycle skip count.

20 Claims, 6 Drawing Sheets

METHODS AND SYSTEMS OF SCANNING FOR RESOURCES FOR RESOURCE CLASSIFICATION IN A MULTI CLOUD ENVIRONMENT

FIELD OF THE INVENTION

Embodiments of the present invention relate generally to cloud-based resource protection. More particularly, embodiments of the invention relate to methods and systems of scanning for resources for resource classification in a multi cloud environment.

BACKGROUND

A software as a service (SaaS) solution, such as Dell EMC's Cloud Snapshot Manager, enables customers to protect their workloads or resources hosted on a cloud platform, for example Amazon Web Services (AWS) and Microsoft Azure, without requiring installation or infrastructure. Workloads (or resources) can include virtual machines (VMs), databases, object storages, and more. Using such solution, customers can discover, orchestrate and automate the protection of workloads across multiple clouds based on policies for seamless backup and disaster recovery.

Typical customers of the SaaS solution have multiple accounts in one or more public clouds. In general, those customers are interested in knowing the number (count) and the list of protected (existent) resources, protected (non-existent) resources, and unprotected resources. This information is provided by the SaaS solution via a graphical user interface, such as a dashboard showing the numbers.

Protected (existent) resources are resources that exist in cloud account and for which there are copies (either as snapshots or backed up into a storage appliance) created by the SaaS solution and captured in its catalog.

Protected (non-existent) resources are resources for which there are copies created and managed by the SaaS solution and have catalog entries, but the resources have been deleted in a customer's cloud account. More specifically, the SaaS solution can have a resource-based licensing model (i.e., number of resources that a customer is entitled to protect). In this licensing model, there is metering in place that checks for consumption of the license on a daily basis. This checks the number of protected resources and whether there is any over consumption. Protected resources include both existent and non-existent resources. They include the non-existent resources so that a user can restore the resources from a copy created and managed by the SaaS solution. Many times, when over consumption is reported, a customer is interested to know what resources are protected but are now non-existent, so that they can verify the resources in their environment.

Unprotected resources are resources that exist in the cloud but are not protected by the SaaS solution. That is, there is no copy of the resources (snapshots or in a storage appliance) created and managed by the SaaS solution.

In general, a customer's expectation to receive data reporting of the information discussed above is close to real-time. However, the state of the customer's public cloud account is continuously changing, i.e., every hour, minute and second new instances of resources, such as VMs, DBs being created or existing instances deleted/removed. To keep up with the customer's expectation, the SaaS solution is required to scan for data (e.g., resources) as often as possible. Unfortunately, this would adversely affect the load on a system.

There are multiple factors that can affect the load on the system, as discussed below.

1. Multiple cloud accounts per customer: Most of the customers are medium to large size organizations. They have multiple cloud accounts in public cloud those are owned by various business units/departments across the organization. This could run into multiples of 10s for medium size company to 100s for large enterprise. Data must be gathered for all cloud accounts that the customer configures within their SaaS solution account.

2. Multiple Regions: Public cloud vendors have regions spread across the globe which runs in multiples of 10s. For example, as of today, AWS supports 25+ regions, whereas Azure supports 53 regions world-wide, and these numbers are continuing to grow.

3. Multiple Resource Types: The SaaS solution supports multiple resource or asset types, such as VMs, various types of databases like RDS, Aurora, DynamoDB, Redshift on AWS. Object stores like Blob Container on Azure. Again, this list will continue to grow as support for more resource types is added in the future.

4. Multiple Customers: The SaaS solution has multi-tenancy support. It therefore must fetch data for each customer across all cloud accounts/regions/resource types.

5. Internet Communication: The SaaS Solution is hosted inside a data center. Data must be fetched from across the globe, i.e., various regions that a public cloud vendor supports. This involves communication over the Internet which would be subject to network issues like latency, bandwidth, load on network, etc. Therefore, the amount connections should be reduced as much as possible.

From the factors discussed above, it can be seen as to how large the matrix can get, for example:

No. of cloud accounts×No. of cloud regions a cloud vendor supports×No. of resource types supported by the SaaS solution Unfortunately, the current solution routinely goes and scans in each of 10s of cloud regions supported, for all resource types supported by the SaaS solution for all cloud accounts configured by the customer. This is done irrespective of whether the customer is protecting any resource of a given resource type in a cloud region for a cloud account or not.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

Embodiments of the disclosure use the information captured in a catalog maintained by the SaaS solution to efficient scan across multiple tenants, multiple cloud accounts, regions and resource-types environment, in order to reduce the load on the system.

According to a first aspect, a method of scanning for protected existent resources in a cloud computing platform is described. For a combination of a cloud account, a cloud region, and a resource type, a percentage of protected existent resources hosted on the cloud computing platform is determined. A cycle skip count is set based on the determined percentage of the protected existent resources hosted on the cloud computing platform. The percentage of the protected existent resources and the cycle skip count associated with the combination are stored in a catalog. For the combination of the cloud account, the cloud region, and the resource type, the protected existent resources hosted on the cloud computing platform are periodically scanned for based on the cycle skip count.

According to a second aspect, a method of scanning for unprotected resources in a cloud computing platform is described. Cloud accounts are fetched from a catalog each having protected resources. For each cloud account, protected resource types are fetched. For each protected resource type, at least one cloud region associated with the cloud account and the protected resource type is fetched. Based on a combination of the cloud account, the cloud region(s), and the protected resource type, it is determined whether a percentage of the protected resources and a cycle skip count associated with the combination are found in the catalog.

According to a third aspect, a method of scanning for protected non-existent resources in a cloud computing platform is described. Resources from a catalog that are not marked as non-existent and have a last protection elapsed time greater than a protection frequency of the resources are fetched. For each fetched resource, it is determined whether the resource is present in the cloud computing platform. In response to determining that the resource is not present in the cloud computing platform, the resource is marked as non-existent in the catalog.

Figure 1:
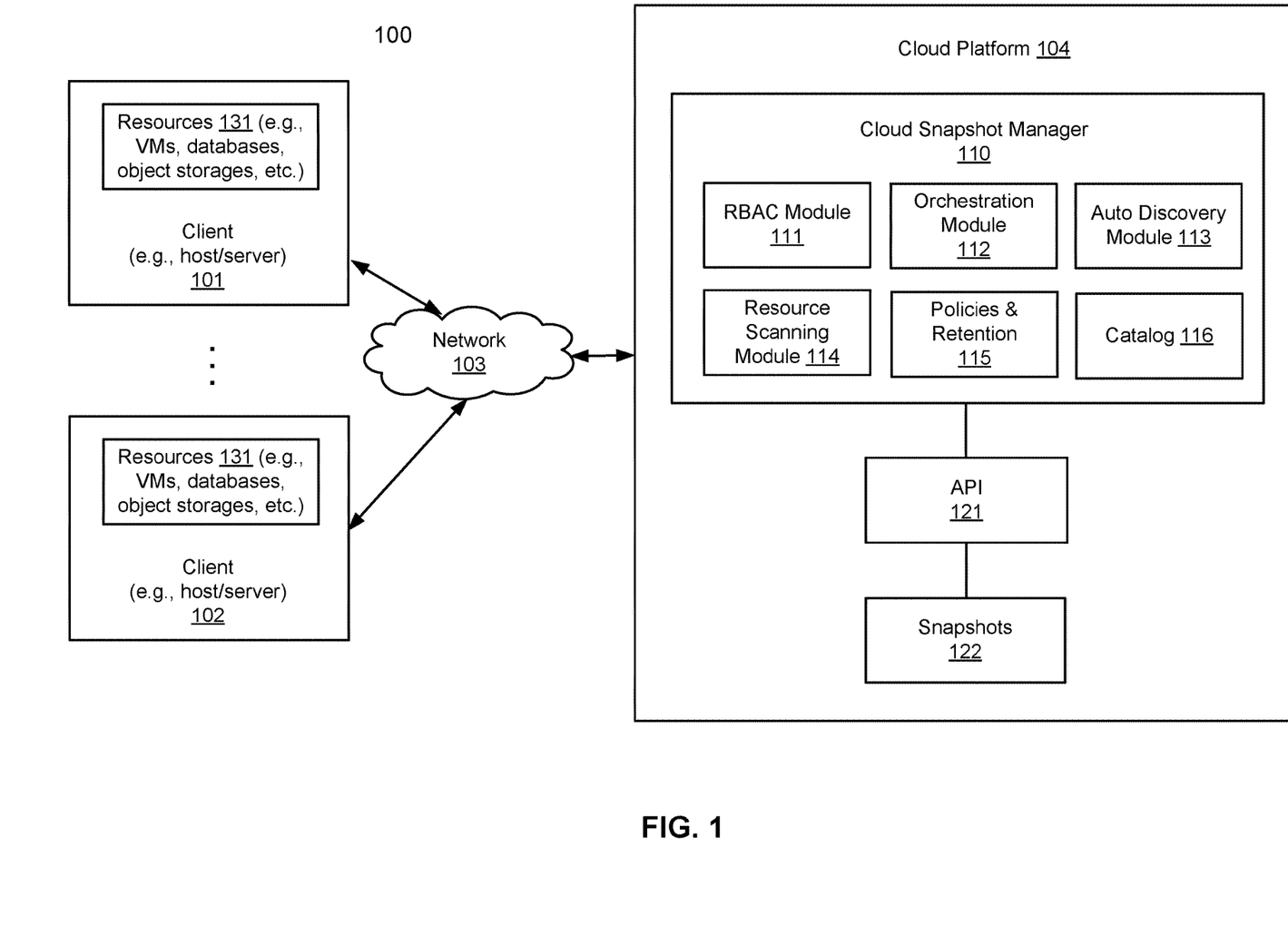
FIG. 1 is a block diagram illustrating a cloud-based resource protection system according to one embodiment.

FIG. 1 is a block diagram illustrating a cloud-based resource protection system according to one embodiment. Referring to FIG. 1, system 100 includes, but is not limited to, one or more client systems 101-102 communicatively coupled to cloud platform (or cloud computing platform) 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system). Network 103 may be any type of networks such as a local area network (LAN), a wide area network (WAN) such as the Internet, a fiber network, a storage network, a cellular network, or a combination thereof, wired or wireless. Clients 101-102 may be in physical proximity or may be physically remote from one another. In an embodiment, each of clients 101-102 may include resources 131 (also referred to as workloads), such as virtual machines (VMs) running on the client, databases coupled to the client, object storages stored on the client, etc.

With continued reference to FIG. 1, cloud platform 104 (e.g., Amazon Web Services (AWS), Microsoft Azure, etc.) may implement computing services on behalf of respective cloud infrastructure tenants, with each tenant corresponding to one or more users associated with respective clients 101-102. By way of example, the computing services may include execution of one or more applications (e.g., software as a service (SaaS) applications) on behalf of each of the users associated with respective clients 101-102. In one embodiment, cloud platform 104 may be implemented as part of a cloud infrastructure in the form of a cloud-based system, such as an AWS system, Microsoft Azure system, and the like.

In an embodiment, cloud platform 104 may include cloud snapshot manager 110 running thereon. In another embodiment, cloud snapshot manager 110 may run on an external system and communicate with cloud platform 104 via an application programming interface (API), not shown, such as an API using cloud identity access management (IAM). Cloud snapshot manager 110 may be a SaaS system that discovers, orchestrates, and automates the protection of resources (or workloads), such as resources 131 of clients 101-102, in the cloud using snapshot technology provided by cloud platform 104. As shown, cloud snapshot manager 110 includes, but not limited to, a role based access control (RBAC) module 111, an orchestration module 112, an auto discovery module 113, and a resource scanning module 114.

In an embodiment, RBAC module 111 is configured to restrict access to a customer's account to authorized users. RBAC module 111 enables protection of resources across multiple cloud platforms, such as cloud platform 104, securely through policies and retention 115. For example, a super administrator in cloud snapshot manager 110 may create roles, each with privileges to perform a certain set of actions, such as viewing resources, viewing jobs, generating reports and creating on-demand snapshots. Policies and retention 115 may tie these roles to one or more cloud accounts that have been set up in cloud snapshot manager 110. All users in cloud snapshot manager 110 are then assigned an appropriate policy. This ensures that the super administrator has control over what actions the users are authorized to perform and what resources they can access.

In an embodiment, orchestration module 112 may orchestrate the protection of workloads (e.g., resources 131) across multiple clouds based on policies and retention 115 by orchestrating and managing the creation, deletion, and restoration of snapshots 122 using API 121 (e.g., representational state transfer (REST) API) provided by cloud platform 104. For example, to protect a resource (e.g., a VM), orchestration module 112 may take a snapshot in cloud platform 104 using API 121, and create a catalog entry in catalog 116 of the protected resource and a list of copies of the protected resource in a database over a time period. In an embodiment, the catalog entry may include an identifier of the resource in cloud platform 104, a cloud account to which the resource belongs, a cloud region where the resource exists, and a resource type of the resource (e.g., VM, database, object storage, etc.). In an embodiment, snapshots 122 may include snapshots of protected resources, such as resources 131. Although not shown in FIG. 1, snapshots 122 may be backed up (or stored) in a snapshot bucket (e.g., S3 bucket). This helps separate the copy of the protected resources from primary data.

In an embodiment, auto discovery module 113 enables automatic discovery of cloud instance (e.g., resources, such as VMs, databases, object storages, etc.) for creation and deletion of snapshots 122, and for resource-specific protection service level agreements (SLAs).

In an embodiment, resource scanning module 114 is configured to efficiently scan cloud platform 104 to identify resources of different resource classes, for example protected (existent) resources, protected (non-existent) resources, and unprotected resources, hosted on cloud platform 104. This efficient scanning (discussed in more detail herein below) can be used to determine the number (count) and the list of protected (existent) resources, protected (non-existent) resources, and unprotected resources, while reducing the load on the systems.

As an example, a customer within a cloud account may not be protecting all types of resources that cloud snapshot manager 110 supports. Along with that, the customer may have resources in two or three cloud regions only, for example. In some cases, the customer may have resources in more than three regions though rarely more than that in a cloud account. In addition, the customer may protect none, few, many, or nearly all resources of a type (e.g., VM, database, object storage, etc.) in a cloud account region. Instead of performing scans for all cloud accounts, for all regions supported by the cloud vendor, and for all resource types supported by cloud snapshot manager 110, in an embodiment, the scans can be periodically performed for a combination of a cloud account, cloud region, and/or resource type for which the customer is protecting resources. Information to generate the combination can be obtained from catalog 116.

As an example, the combination can be any one of the following:
{Cloud_account_1, US-East-1, VM},
{Cloud_account_1, US-West-1, VM},
{Cloud_account_1, US-West-1, DB},
{Cloud_account_2, US-West-1, VM}, or
{Cloud_account_2, US-West-1, DB}

In an embodiment, to scan for (or identify) protected existent resources hosted on cloud platform 104, resource scanning module 114 may periodically perform scans based on a percentage of the protected existent resources that exist in the system for a particular combination. Based on the percentage of the protected existent resources, module 114 can determine or derive a corresponding cycle skip count associated with the combination. A cycle skip count refers to a number of scan cycles to skip for a given combination (described in more detail herein below). A scan cycle is the performance of scanning for all tenants, the tenants' cloud accounts for all regions and resource types multiple times in a day. Based on the determined cycle skip count, module 114 can periodically scan the system (e.g., cloud regions) for the protected existent resources in order to calculate the number (count) of the protected existent resources in the system.

In an embodiment, to scan for (or identify) unprotected resources, resource scanning module 114 may invoke API calls (to API 121) into a cloud account with cloud platform 104 to fetch for a list of resources of a given resource type (e.g., VM, database, object storage, etc.) and in a given cloud region (e.g., US-West-1, US-East-1). Module 114 may check resources returned in the list from cloud platform 104 against catalog 116, which includes information of protected resources. Resources that are not found in catalog 116 can be noted or marked as unprotected resources.

In an embodiment, to scan for (or identify) protected non-existent resources, resource scanning module 114 may fetch for a list of resources in catalog 116 that are not marked as non-existent. For each resource in the list, module 114 may check whether the resource exists in cloud platform 104, for example, by invoking an API call (to API 121) into a cloud account. If the resource does not exist in cloud platform 104, module 114 may mark that resource as non-existent in catalog 116.

Figure 2:
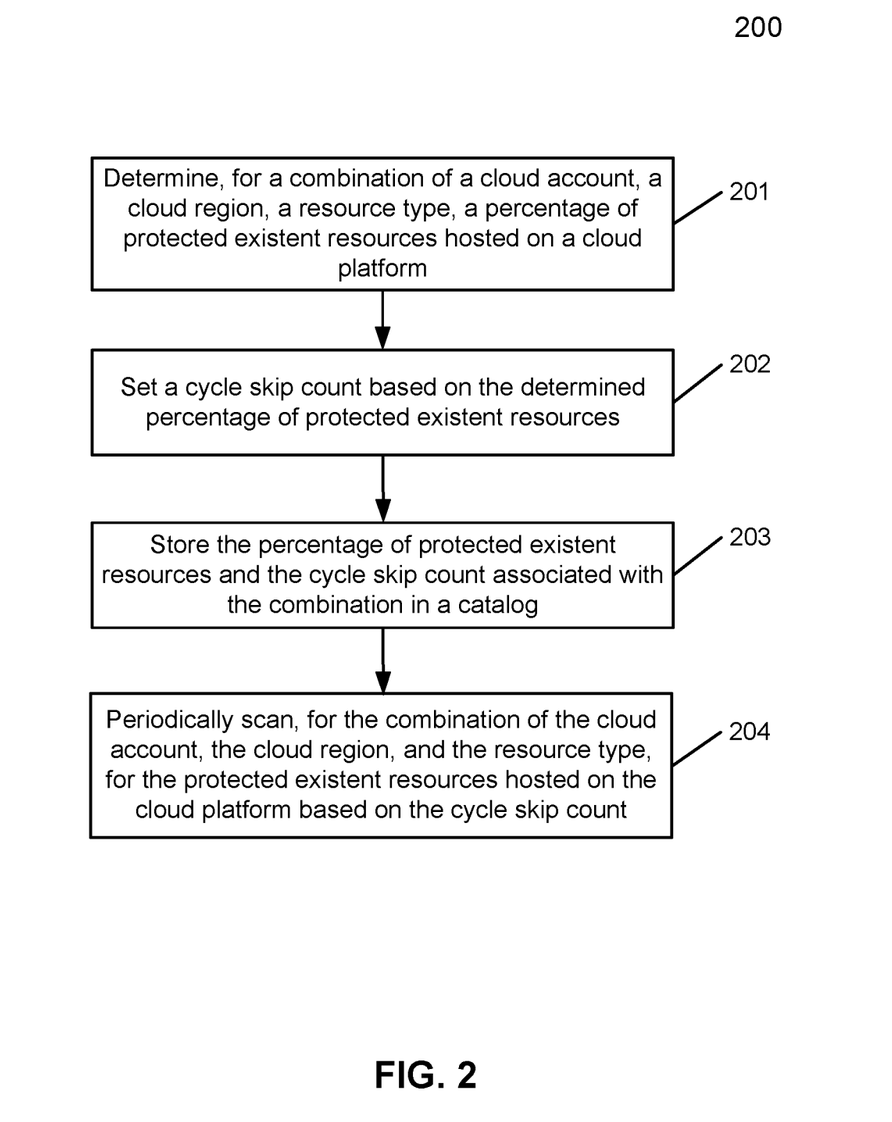
FIG. 2 is a flow diagram illustrating a method of scanning for protected existent resources according to one embodiment.

FIG. 2 is a flow diagram illustrating a method of scanning for protected existent resources according to one embodiment. Process 200 may be performed by processing logic that includes hardware (e.g. circuitry, dedicated logic, etc.), software (e.g., embodied on a non-transitory computer readable medium), or a combination thereof. For example, process 200 may be performed by resource scanning module 114 of FIG. 1.

Referring to FIG. 2, at block 201, the processing logic determines, for a combination of a cloud account, a cloud region, and a resource type, a percentage of protected existent resources hosted on a cloud platform (e.g., cloud platform 104 of FIG. 1). In an embodiment, the percentage of protected existent resources can be determined based on a total number of resources found in a catalog (e.g., catalog 116) for the combination and a total number of resources found in a cloud platform (e.g., cloud platform 104) for the combination. More specifically, the percentage can be calculated as follows:

$$\% \text{ of Protected Existent Resources} = \frac{\text{Total Number of Resources found in Catalog for Combination} * 100}{\text{Total number of Resources found in Cloud Platform for Combination}}$$

In an embodiment, a combination resulting in a higher percentage of protected existent resources means that a customer is more interested or concerned about protecting any new resources that may appear in that combination. Thus, the customer is interested in knowing a list of unprotected resources as it is key for them.

On the other hand, a combination where the percentage of protected existent resources is less may imply that the customer may not be as much concerned about knowing the unprotected resources in this environment. Thus, the scans can be performed at a lesser frequency in a day.

In an embodiment, if the customer is not protecting any resource for a given combination of cloud account, cloud region and resource type, this means the customer is least concerned about protecting resources in that environment. Thus, the customer is also least concerned in knowing what the unprotected resources are. For such combination, the scanning is not required to be performed during daily scheduled cycles. For example, the scanning can be done on-demand or once a week or month period.

At block 202, the processing logic sets a cycle skip count based on the determined percentage of protected existent resources. In an embodiment, the cycle skip count may be predefined and set based on the percentage of protected existent resources. As an example, a lookup table (or another data structure) can be used to map a range of the percentage of protected existent resources (as an input) to the cycle skip count (as an output). An example of the lookup table is shown below.

TABLE 1

Cycle Skip Count

| Percentage of Protected Existent Resources (%) | Cycle Skip Count in a day | Definitions |
| --- | --- | --- |
| More than 70% | 0 | Scan in all cycles in a day |
| Between 40-70% | 1 | Scan in alternate cycles in a day |
| Between 20-40% | 2 | Scan once every third cycle |
| Between 1-20% | 3 | Scan once every fourth cycle in a day |

It is to be understood that Table 1 shown above is merely an example. Other values and definitions can be used in the table to achieve the same results without departing from the spirit of the disclosure.

Based on the table shown above, as an example, if '% of protected existent resources' is 80%, set 'Cycle Skip Count' to 0. Thus, for this combination, a scan is performed in every cycle. As another example, if '% of protected existent resources' is 50%, set 'Cycle Skip Count' to 1. Thus, for this combination, a scan is performed in every alternate cycle.

At block 203, the processing logic stores the percentage of protected existent resources and the cycle skip count for the combination in the catalog (e.g., catalog 116 of FIG. 1).

At block 204, the processing logic periodically scans, for the combination of the cloud account, the cloud region, and the resource type, for the protected existent resources hosted on the cloud platform based on the cycle skip count.

Figure 3A:
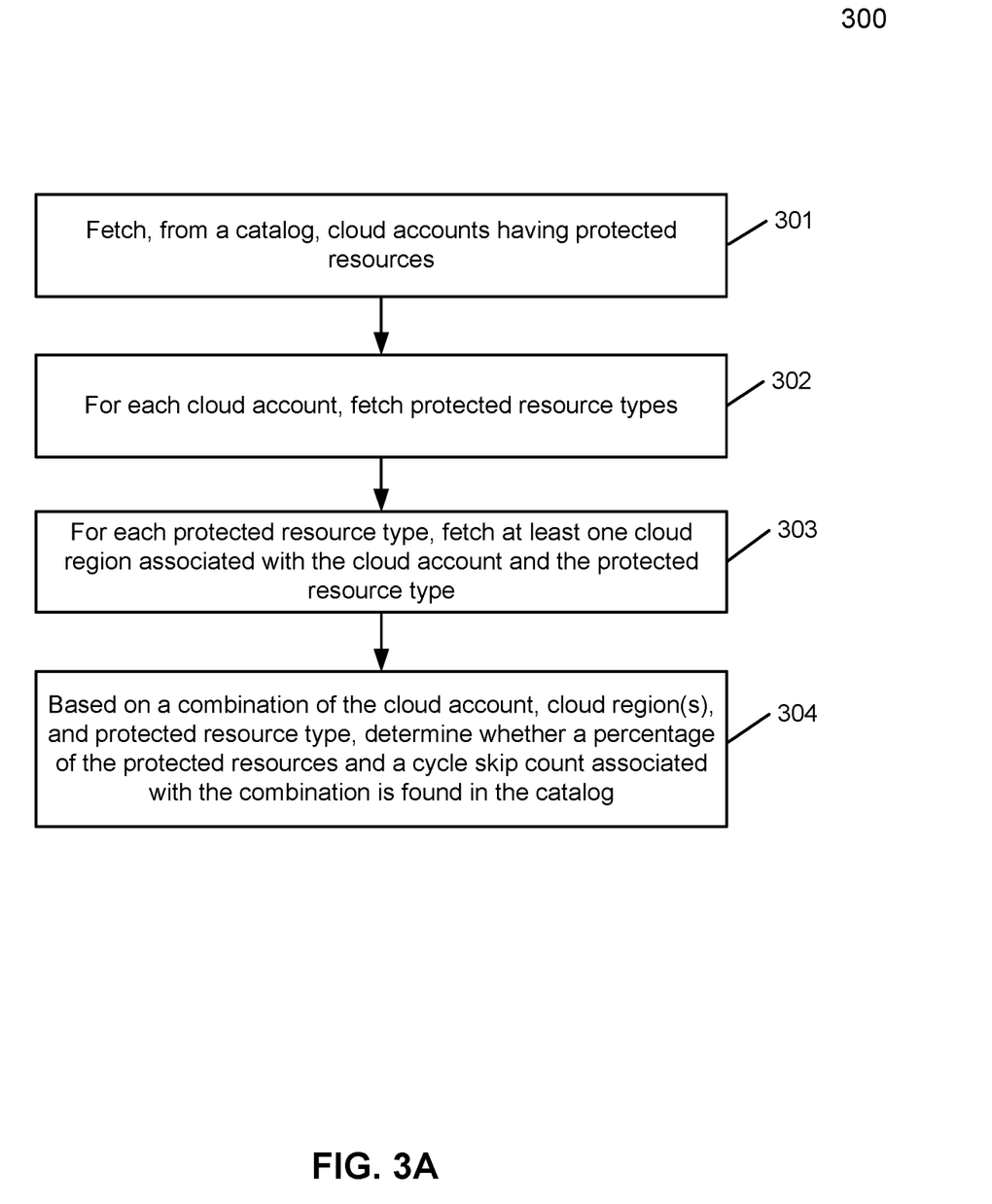
FIGS. 3A-3B are flow diagrams illustrating a method of scanning for unprotected resources according to one embodiment.
Figure 3B:
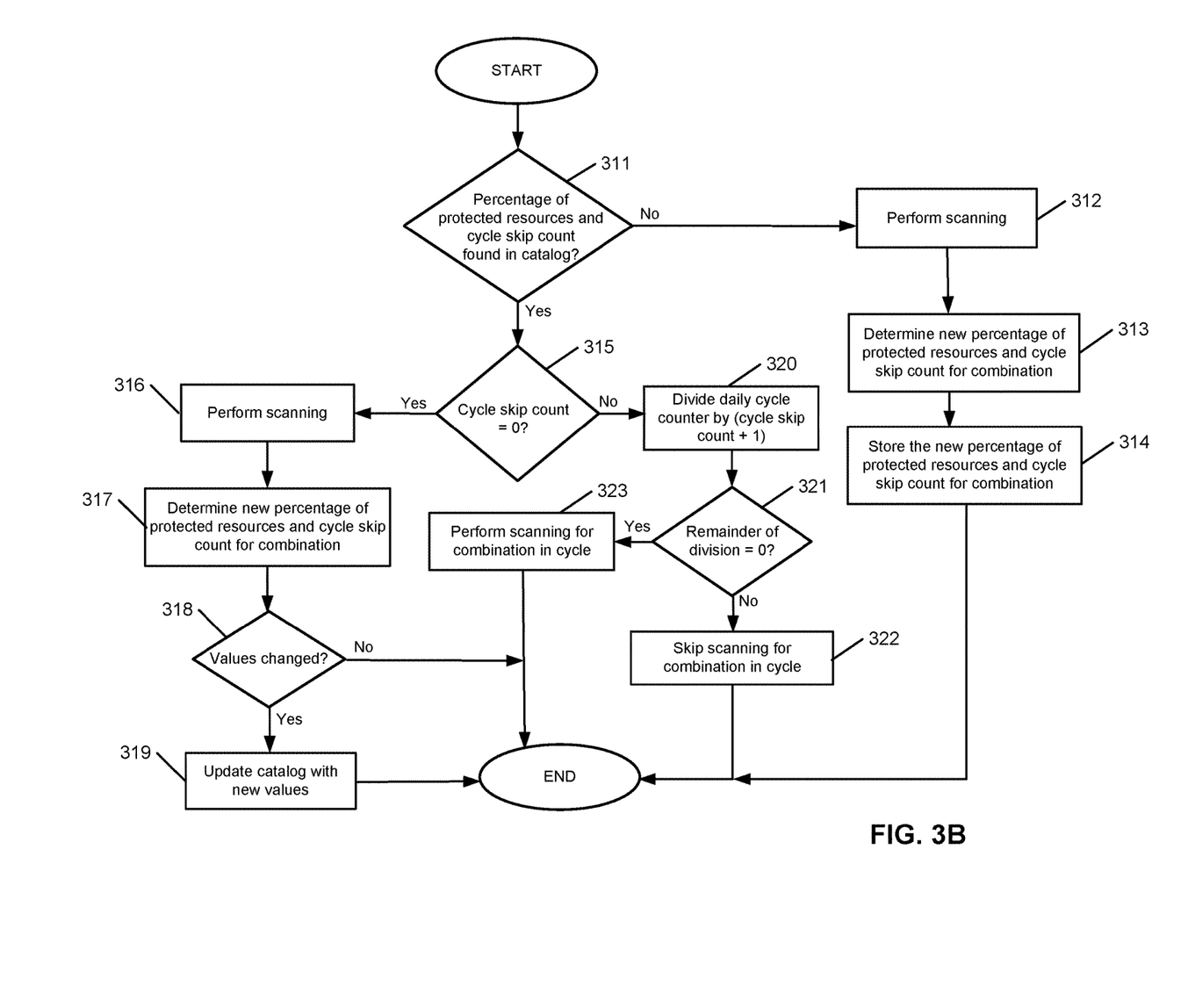

FIGS. 3A-3B are flow diagrams illustrating a method of scanning for unprotected resources according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by resource scanning module 114 of FIG. 1.

Referring to FIG. 3A, at block 301, the processing logic fetches, from a catalog (e.g., catalog 116 of FIG. 1), cloud accounts have protected resources (e.g., resources of any type, in any cloud region). At block 302, the processing logic, for each cloud account, fetches protected resource types (e.g., VM, database, object storage, etc.). At block 303, the processing logic, for each protected resource type, fetch at least one cloud region associated with the cloud account and the protected resource type. At block 304, the processing logic, based on a combination of the cloud account, the cloud region(s), and the protected resource type, determines whether a percentage of the protected resources and a cycle skip count associated with the combination is found in the catalog. Embodiments as related to the percentage of the protected resources and the cycle skip count have been previously described, and for brevity sake, will not be described again herein.

Referring now to FIG. 3B, at block 311, if it is determined that the percentage of the protected resources and the cycle skip count are found in the catalog, the processing logic proceeds to block 315. Otherwise, the processing logic proceeds to block 312.

At block 312, the processing logic may perform scanning for the combination of the cloud account, the cloud region(s), and the protected resource type. For example, the processing logic may invoke API calls (e.g., to API 121 of FIG. 1) into the cloud account with a cloud platform (e.g., cloud platform 104) to fetch for a list of resources of the protected resource type (e.g., VM, database, object storage, etc.) in the cloud region(s) (e.g., US-West-1, US-East-1). The processing logic may check resources returned in the list from the cloud platform against the catalog, which includes information of protected resources. Resources that are not found in catalog can be recorded or marked as unprotected resources.

At block 313, the processing logic determines a new percentage of protected resources and a new cycle skip count for the combination. For example, while performing the scanning in block 312, the processing logic may capture the total number of resources for the combination found in the catalog and the total number of resources listed from the cloud platform for the combination. Again, the determination of the percentage of protected resources and cycle skip count has been previously described.

At block 314, the processing logic may store the new percentage of protected resources and the new cycle skip count for the combination in the catalog.

At block 315, the processing logic determines whether the cycle skip count found in the catalog is 0. If so, the processing logic proceeds to block 316. Otherwise (cycle skip count is non-zero) the processing logic proceeds to block 320.

At block 316, the processing logic may perform scanning, based on the cycle skip count, for the combination of the cloud account, the cloud region(s), and the protected resource type. For example, the processing logic may invoke API calls (e.g., to API 121 of FIG. 1) into the cloud account with a cloud platform (e.g., cloud platform 104) to fetch for a list of resources of the protected resource type (e.g., VM, database, object storage, etc.) and in the cloud region(s) (e.g., US-West-1, US-East-1). The processing logic may check resources returned in the list from the cloud platform against the catalog, which includes information of protected resources. Resources that are not found in catalog can be recorded or marked as unprotected resources.

At block 317, the processing logic determines a new percentage of protected resources and a new cycle skip count for the combination. For example, while performing the scanning in block 316, the processing logic may capture the total number of resources for the combination found in the catalog and the total number of resources listed from the cloud platform for the combination. Again, the determination of the percentage of protected resources and cycle skip count has been previously described.

At block 318, if values of the new percentage of protected resources and the new cycle skip count for the combination have changed (as compared to the ones found in the catalog), the processing logic proceeds to block 319, where the processing logic updates the catalog with the new values.

At block 320, the processing logic divides a daily cycle counter by a sum of the cycle skip count and 1. The daily cycle counter refers to a counter maintained for a cycle of scanning performed in a day. The daily cycle counter can be reset to 1 for the first scan of the day, and incremented during each subsequent cycle during the day.

At block 321, the processing logic determines whether a remainder of the division is 0. If so, the processing logic proceeds to block 323 where the processing logic performs scanning for the combination in the cycle. Performance of the scanning has been previously described in block 316, and for brevity sake, will not be described again herein. Otherwise, the processing logic proceeds to block 322 where the processing logic may skip the scanning for the combination in the cycle.

As an example to illustrate the point above, assume the cycle skip count is 1 and the daily cycle counter is 1 (i.e., first scan cycle of the day). Then, the daily cycle counter is divided by the sum of the cycle skip count and 1, i.e., 1/(1+1), and thus, the remainder is 1. In this scenario, the scanning is skipped for the combination. As another example, if the cycle skip count is 1 and the daily cycle counter is 2 (i.e., second scan cycle of the day), the remainder would be 0, i.e., 2/(1+1). In this scenario, the scanning would be performed for the combination. In this way, the scanning would be skipped in alternate cycle when the cycle skip count is 1. Likewise, for a cycle skip count of 2, 3, etc., those number of cycles would be skipped before a next scan performed for the combination. This way the load on the system can be reduced while helping in the updating of the system more frequently for more important combination. Since the percentage of protected resources is calculated every time a scan is performed for a given combination and its corresponding cycle skip count, and updated if the present values are different than the previous values, any changes in the percentage are taken care of, thereby increasing or reducing the scan frequency.

Figure 4:
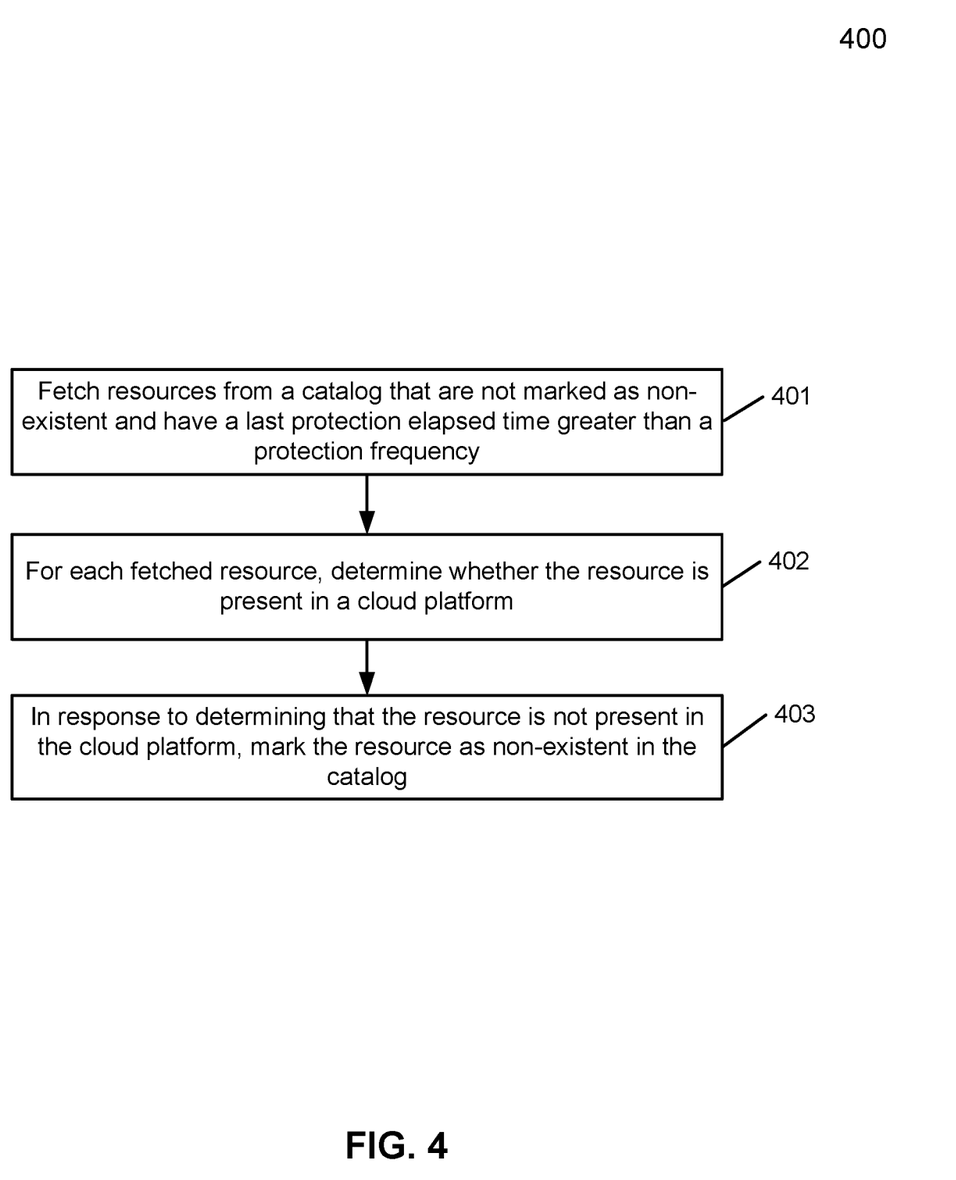
FIG. 4 is a flow diagram illustrating a method of scanning for protected non-existent resources according to one embodiment.

FIG. 4 is a flow diagram illustrating a method of scanning for protected non-existent resources according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by resource scanning module 114 of FIG. 1.

Referring to FIG. 4, at block 401, the processing logic fetches resources from a catalog (e.g., catalog 116 of FIG. 1) that are not marked as non-existent and have a last protection elapsed time greater than their protection frequency. For example, resources that have a daily schedule and protected within the last 24 hours are not included in the fetched resources, thereby reducing the number of resources to check in a cloud platform for their existence. In this way, resources that were protected within a time gap of their frequency can be filtered out. The last protection elapsed time refers to an elapsed time since a resource was last protected, e.g., by cloud snapshot manager 110 of FIG. 1. In an embodiment, catalog 116 maintained by cloud snapshot manager 110 may include information of the last protection elapsed time and the frequency with which the resource is being protected.

At block 402, for each fetched resource, the processing logic determines whether the resource is present in a cloud platform (e.g., cloud platform 104). For example, the processing logic can invoke an API call into a cloud account to determine whether the resource is present in the cloud platform for that cloud account.

At block 403, in response to determining that the resource is not present in the cloud platform, the processing logic may mark the resource as non-existent in the catalog.

According, in process 400, filtering of resources is performed not only for those resources that are not marked as non-existent but also based on their last protection time being, for example more than 24 hours, in the past. This means that if a resource was protected within last 24 hours, for example, then the probability of the resource still existing in the cloud platform is high, and thus, the resource can be excluded from the fetch. This can greatly help in reducing the load as most cases, at any given point in time the total number of resources protected and registered as 'existent' but not protected for a time period more than their schedule, for example 24 hours for daily schedule, will be much less than the total number of resources protected within that time period.

Note that some or all of the components as shown and described above (e.g., cloud snapshot manager 110) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
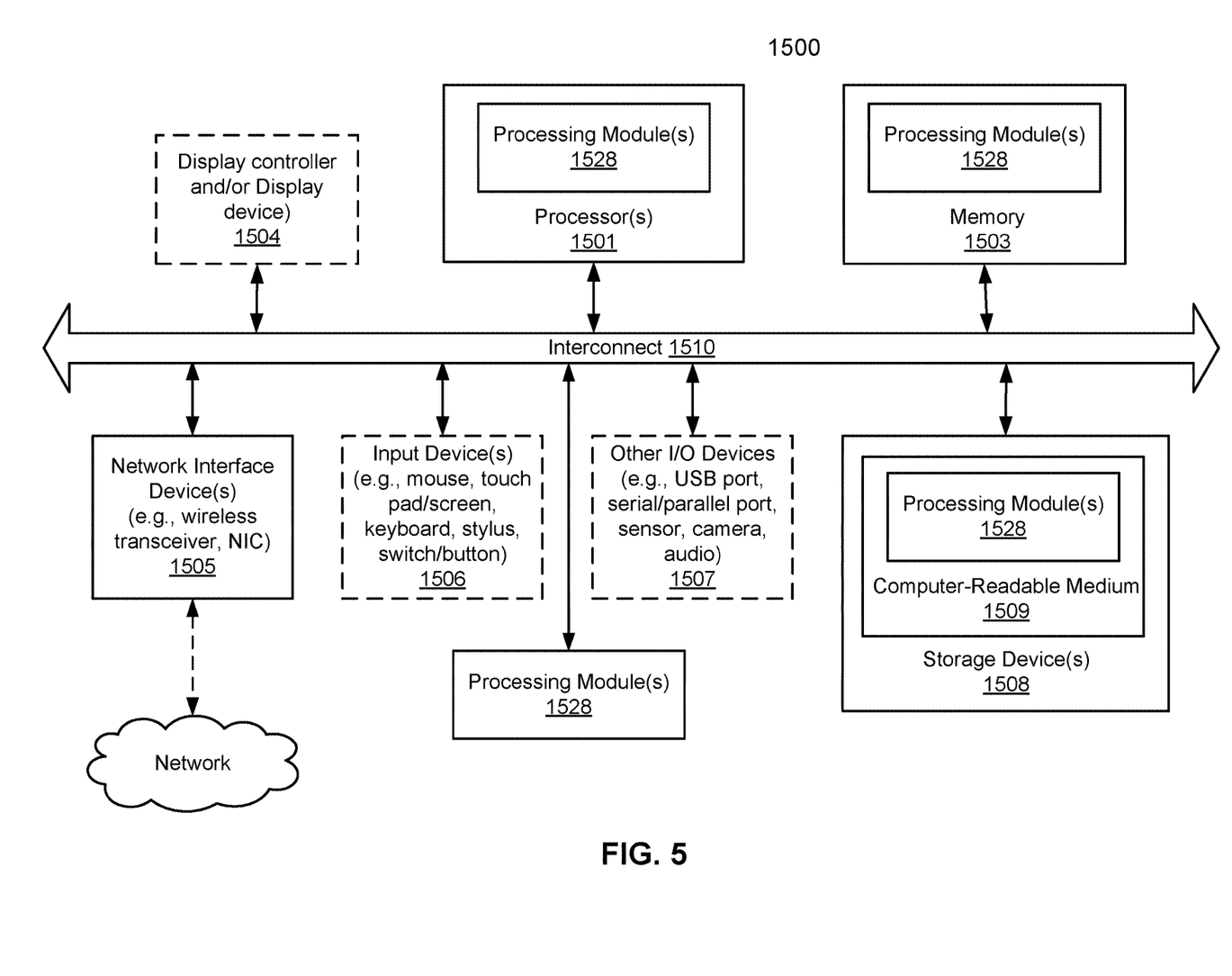
FIG. 5 is a block diagram illustrating a data processing system according to one embodiment.

FIG. 5 is a block diagram illustrating an example of a data processing system which may be used with one embodiment of the invention. For example, system 1500 may represent any of data processing systems described above performing any of the processes or methods described above. In one embodiment, system 1500 may be implemented as part of clients 101-102. In another embodiment, system 1500 may execute the cloud platform 104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 111-114 of FIG. 1, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of backing up existent resources in a cloud computing platform, the method comprising:
   determining, for a combination of a cloud account, a cloud region, and a resource type, a percentage of protected existent resources hosted on the cloud computing platform, wherein the percentage of protected existent resources is based on a total number of resources in a catalog and a total number of resources on the cloud computing platform;
   as a result of the determining, setting a cycle skip count, the cycle skip count comprising a number of scan cycles to skip for a given combination, the cycle skip count based at least in part on the percentage of the protected existent resources;
   storing, in the catalog, the percentage of the protected existent resources and the cycle skip count associated with the combination;
   scanning, based on the cycle skip count and a daily cycle counter, the daily cycle counter set to one upon a first scan of a day and incremented during each potential subsequent scan cycle, for the combination of the cloud account, the cloud region, and the resource type, for the protected existent resources hosted on the cloud computing platform; and
   backing up the protected existent resources according to a determination that a division of the cycle skip count by the daily cycle counter results in a remainder of zero.

2. The method of claim 1, wherein determining the percentage of the protected existent resources hosted on the cloud computing platform comprises:
   determining a total number of resources found in the catalog for the combination,
   determining a total number of resources found in the cloud computing platform for the combination, and
   determining the percentage of the protected existent resources hosted on the cloud computing platform based on the total number of resources found in the catalog for the combination and the total number of resources found in the cloud computing platform for the combination.

3. The method of claim 1, wherein the percentage of the protected existent resources is mapped to the cycle skip count in a lookup table.

4. The method of claim 1, wherein the catalog is created and maintained by a software as a service (SaaS) system that automates protection of resources in the cloud computing platform.

5. The method of claim 1, wherein the cycle skip count corresponds to a scan in all cycles in a day, a scan in alternate cycles in the day, a scan in every third cycle in the day, or a scan in every fourth cycle in the day.

6. A computer-implemented method of backing up resources in a cloud computing platform, the method comprising:

fetching, from a catalog, a set of cloud accounts having protected resources; and for each cloud account of the set of cloud accounts:

fetching protected resource types;

for each protected resource type, fetching a cloud region associated with the cloud account and the protected resource type;

based on a combination of the cloud account, the cloud region, and the protected resource type, determining whether a percentage of the protected resources and a cycle skip count associated with the combination are found in the catalog, wherein the percentage of protected existent resources is based on a total number of resources in the catalog and a total number of resources on the cloud computing platform, the cycle skip count comprising a number of scan cycles to skip for a given combination, the cycle skip count based at least in part on the percentage of the protected existent resources; and backing up the protected resources according to a determination that a division of the cycle skip count by a daily cycle counter, the daily cycle counter set to one upon a first scan of a day and incremented during each potential subsequent scan cycle, results in a remainder of zero.

7. The method of claim 6, further comprising:

in response to determining that the percentage of the protected resources and the cycle skip count are found in the catalog, determining whether the cycle skip count is a first value; and in response to determining that the cycle skip count is the first value, scanning, for the combination, for unprotected resources hosted on the cloud computing platform.

8. The method of claim 7, further comprising:

determining a new percentage of protected resources and a new cycle skip count for the combination;

determining whether values of the new percentage of protected resources and the new cycle skip count have changed, as compared to values of the percentage of the protected resources and the cycle skip count; and updating the catalog with the values of the new percentage of protected resources and the new cycle skip count in response to determining that the values of the new percentage of protected resources and the new cycle skip count have changed.

9. The method of claim 7, further comprising:

in response to determining that the cycle skip count is not the first value, dividing a daily cycle counter by a sum of the cycle skip count and 1.

10. The method of claim 9, further comprising:

determining whether a remainder of the dividing is zero;

in response to the determining, again scanning, for the combination, for the unprotected resources hosted on the cloud computing platform.

11. The method of claim 10, further comprising:

in response to determining that the remainder of the dividing is non-zero, skipping scanning for the unprotected resources hosted on the cloud computing platform.

12. The method of claim 9, wherein the daily cycle counter resets to 1 for a first scan of a day and increments during each subsequent cycle during the day.

13. The method of claim 7, further comprising:

in response to determining that the percentage of the protected resources and the cycle skip count are not found in the catalog, again scanning, for the combination, for the unprotected resources hosted on the cloud computing platform.

14. The method of claim 13, further comprising:

determining a new percentage of protected resources and a new cycle skip count for the combination; and storing the new percentage of protected resources and the new cycle skip count for the combination in the catalog.

15. The method of claim 7, wherein scanning for the unprotected resources hosted on the cloud computing platform comprises:

fetching a list of resources of a protected resource type in the cloud region, checking the list of resources of the protected resource type against the catalog, and marking resources, from the list of resources, that are not found in the catalog as unprotected resources.

16. The method of claim 7, wherein the first value is zero.

17. A computer-implemented method of backing up protected non-existent resources in a cloud computing platform, the method comprising:

fetching a resource from a catalog, the resource not marked as non-existent and having a last protection elapsed time greater than a protection frequency associated with the resource, wherein a percentage of protected existent resources is based on a total number of resources in the catalog and a total number of resources on the cloud computing platform;

determining whether the resource is present in the cloud computing platform;

in response to determining that the resource is absent from the cloud computing platform, marking the resource as non-existent in the catalog;

scanning, based on a cycle skip count, the cycle skip count based at least in part on the percentage of the protected existent resources, and a daily cycle counter, the daily cycle counter set to one upon a first scan of a day and incremented during each potential subsequent scan cycle, for the protected existent resources hosted on the cloud computing platform; and backing up a set of resources, the set of resources excluding the resource, according to a determination that a division of the cycle skip count by the daily cycle counter results in a remainder of zero.

18. The method of claim 17, wherein determining whether the resource is present in the cloud computing platform comprises invoking an application programming interface (API) call into a cloud account to determine whether the resource is present in the cloud computing platform for the cloud account.

19. The method of claim 17, wherein the last protection elapsed time is an elapsed time since a resource was last protected.

20. The method of claim 17, wherein the protection frequency is 24 hours.

* * * * *